United States Patent [19]

Kishima

[11] 4,437,181

[45] Mar. 13, 1984

[54] AUTOMATIC RECORD PLAYING APPARATUS HAVING A TONE ARM POSITION DETECTING DEVICE

[75] Inventor: Yukihiro Kishima, Yokohama, Japan

[73] Assignee: Victor Company of Japan, Ltd., Japan

[21] Appl. No.: 182,407

[22] Filed: Aug. 26, 1980

[30] Foreign Application Priority Data

Aug. 27, 1979 [JP] Japan .......................... 54-117781[U]
Aug. 27, 1979 [JP] Japan .......................... 54-117782[U]

[51] Int. Cl.³ .............................................. G11B 3/06
[52] U.S. Cl. ..................................... 369/244; 369/33; 369/41; 369/215; 369/230; 369/226
[58] Field of Search ................. 369/33, 216, 224, 225, 369/226, 227, 228, 41, 230, 244, 222

[56] References Cited

U.S. PATENT DOCUMENTS

| | | | |
|---|---|---|---|
| 3,506,269 | 4/1970 | Hannah | 369/33 |
| 3,993,315 | 11/1976 | Hansen et al. | 369/216 |
| 4,142,729 | 3/1979 | McLennan | 369/224 |
| 4,184,688 | 1/1980 | Omura et al. | 369/216 |
| 4,196,379 | 4/1980 | Iyeta et al. | 369/226 |

FOREIGN PATENT DOCUMENTS

| | | |
|---|---|---|
| 833329 | 4/1960 | United Kingdom . |
| 1086282 | 10/1967 | United Kingdom . |
| 1210483 | 10/1970 | United Kingdom . |
| 1395265 | 5/1975 | United Kingdom . |
| 1409640 | 10/1975 | United Kingdom . |
| 2000895 | 1/1979 | United Kingdom . |
| 2062336 | 5/1981 | United Kingdom ................. 369/41 |

*Primary Examiner*—Steven L. Stephan
*Attorney, Agent, or Firm*—Anthony H. Handal

[57] ABSTRACT

A record disc playing apparatus has a tone arm position detecting device which comprises a position detection part comprising a plurality of reading elements aligned in line, a code part comprising a plurality of rows of code patterns shifted in the direction of alignment of reading elements and extending along substantially perpendicular directions to the alignment direction of reading elements, and an encoder which is supplied with the output signal of the position detection part and produces address signals according to the relative position of the position detection part and the reading part. One of the code part and the position detection part is fixed and the other unitarily undergoes displacement with a tone arm of the record disc playing apparatus. The position detection part relatively scans the code patterns of the code part, the code patterns have combinations of existence and non-existence portions in the alignment direction of the reading elements, the combinations are arranged differently according to the position of the relative scanning by the position detection part.

6 Claims, 8 Drawing Figures

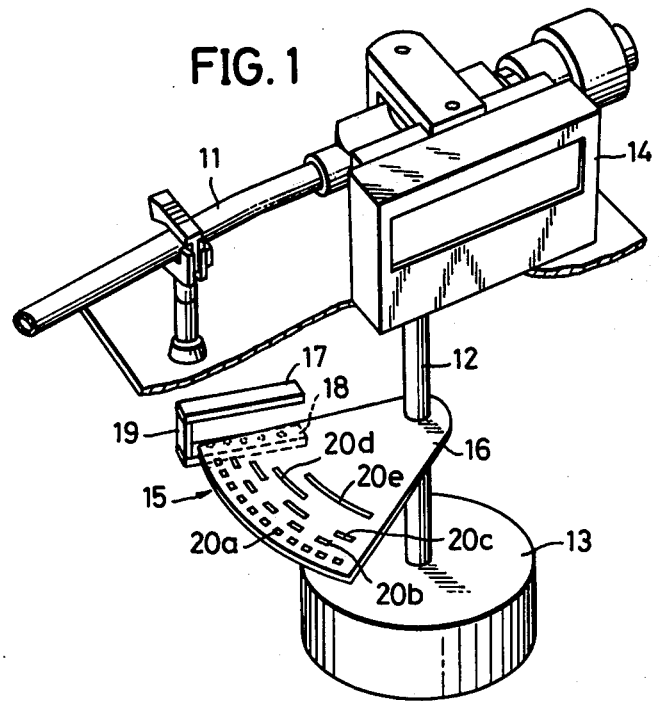
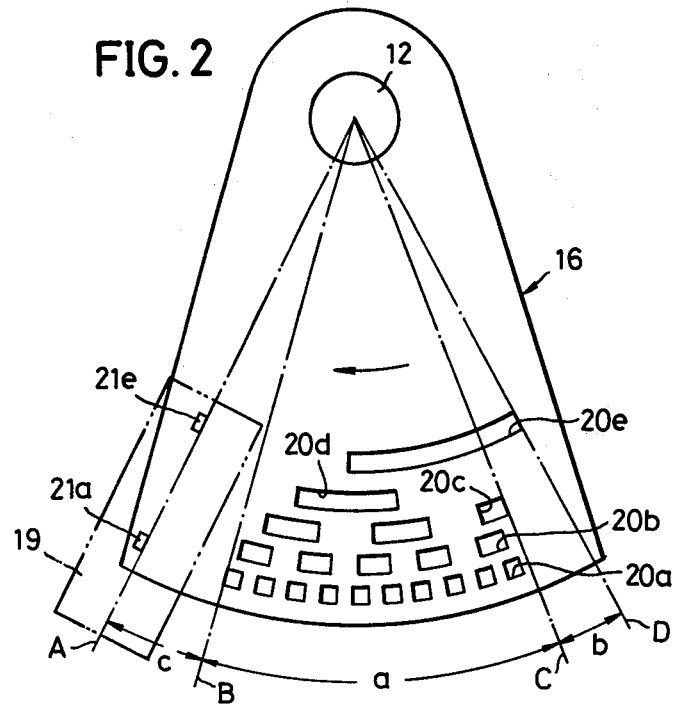

AUTOMATIC RECORD PLAYING APPARATUS HAVING A TONE ARM POSITION DETECTING DEVICE

BACKGROUND OF THE INVENTION

This present invention relates generally to automatic record playing apparatuses having tone arm position detecting devices, and more particularly to a record playing apparatus capable of automatically playing a record disc by using an output signal produced by the detecting device which output signal is a signal corresponding to the position of the tone arm which is detected by the tone arm detecting device.

In general, when a record disc contains a number of pieces of music on the same side thereof, two of consecutive pieces are separated from each other by a coarse groove portion, which will be referred to as a separation band, at which no information has been prerecorded. These separation bands are provided not only for providing a short interval between pieces of music but also for making it easy to place the stylus of the phonograph cartridge or pickup so that a specific piece of music may be selectively played back. However, in order to succeed in such selection and positioning of the stylus onto a separation band just prior to a desired piece of music the user or operator of the record playing apparatus has to be skilled. Namely, since the separation band has a relatively narrow width, the stylus might be positioned onto a wrong position, i.e. a fine-groove portion, when the pickup arm is manipulated manually, and furthermore, there is a possibility that the stylus and/or the record grooves might be damaged.

Recently, new programmable automatic record playing apparatuses have been developed to remove the above mentioned inconveniences. Namely, according to these known playing apparatuses the pickup arm is automatically positioned in accordance with a command signal produced in view of the pickup arm position detected by means of a photosensor so that pieces of music, which have been programmed, will be reproduced in a sequence. However, the photosensor for detecting the position of the arm is incorporated in or built in the pickup shell or casing.

Therefore, it is impossible to replace such a pickup cartridge with a desired one. Furthermore, the above-mentioned known automatic record playing apparatuses are not equipped with a memory for storing distances between the separation bands, and therefore, when a plurality of programmed pieces of music are reproduced, in a sequence the pickup arm has to be returned to the peripheral portion of the disc each time prior to selecting the next piece. Since the pickup arm returns to the outer portion of the disc each time on selection of a piece of music, prior to a correct positioning of the arm onto a programmed separation band, namely the pickup arm moves back and forth, it is time consuming. In other words, a relatively long access time is required in the known programmable automatic record player.

Accordingly, the inventor of the present invention has already proposed a programmable automatic record playing apparatus capable of selecting pieces of recorded information within a short access time, and accurately positioning and lowering the stylus of the pickup cartridge to a desired position.

The present invention has been developed in order to provide a tone arm position detecting device suitable for this type of programmable automatic record playing apparatus.

SUMMARY OF THE INVENTION

Accordingly, it is a general object of the present invention to provide a novel and useful record playing apparatus having at one arm position detecting device.

Another object of the invention is to provide a record playing apparatus having a tone arm position detecting device which comprises a reading section having a plurality of reading elements aligned, and a code section having code patterns provided in a substantially perpendicular direction with the reading section, shifted along the above aligned direction. One of the reading or the code section displaces together with the tone arm relative to the other, and accompanied by this displacement, the signal is picked up by the reading section. The output signal is supplied to an encoder and coded. The coded signal comprises information relative to the displacement position of the tone arm, and is supplied to the control device comprising a memory device of the record playing apparatus. Signals relative to a number of tone arm displacement positions can be obtained even by the few number of bits in the reading elements and the code patterns.

Other objects and further features of the invention will be apparent from the following detailed description when read in conjunction with the accompanying drawings.

BRIEF DESCRIPTION OF THE DRAWING

FIG. 1 is a perspective view of the essential parts of one example of an automatic record playing apparatus applied with a first embodiment of the tone arm position detecting device of the present invention;

FIG. 2 is a plan view of a code plate shown in FIG. 1;

DETAILED DESCRIPTION

Figure 3:
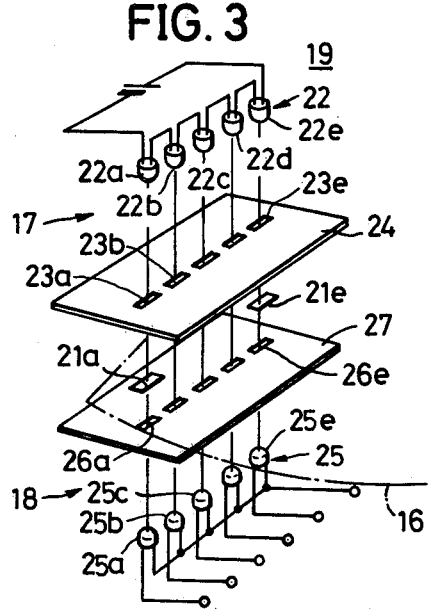
FIG. 3 is an exploded perspective view for explaining the position detection part shown in FIG. 1.

The essential part of one example of an automatic record playing apparatus applied with a first embodiment of the tone arm position detecting device of the present invention will be described in conjunction with FIG. 1.

A tone arm 11 provided with a pickup cartridge at its distal outer end, is pivotally supported in a manner permitting it to swing freely horizontally and vertically on a shaft 12. Upon automatic playing, a horizontal driving force is imparted in the horizontal swinging direction to the tone arm 11 by the operation of a horizontal drive motor 13. Furthermore, a force is imparted in the vertical rotational direction to the tone arm 11 by the operation of a vertical drive motor 14.

A tone arm position detecting device 15 of the present invention comprises a position detection part 19 substantially comprising a fan-shaped code plate 16, a light emitting part 17, and a light receiving part 18. The code plate 16 is fixed horizontally to the shaft 12. The code plate 16 is provided therethrough with accurate rows of through holes 20a through 20e of pattern arrangements according to the respectively different codes. These through holes are formed arcuately and concentrically. Above and below the code plate 16, there are fixedly provided, respectively, the light emitting part 17 of the position detection part 19 and the light receiving part 18 confronting each other. Light emitting elements of the light emitting part 17 and light receiving elements of the light receiving part 18 respectively confront each other, and extend along the radial direction of the code plate 16.

The code plate 16 has a shape shown in FIG. 2, and rotates in the direction of the arrow with the tone arm 11 and the shaft 12. Associated with the rotation of the code plate 16, when the rotation position of the tone arm 11 (that is, the rotational position of the stylus tip of the pickup cartridge provided at the distal end of the tone arm 11) is at the arm rest position, the record disc outermost peripheral groove position, the record disc innermost groove position, and the innermost position of the lead-out groove, the relative position with respect to the center line extending direction of the position detection part 19 are respectively designated by A, B, C, and D. The range a between the positions B and C corresponds to the recorded sound groove part of the record disc, the range b between the positions C and C corresponds to the lead out groove position, and the range c between the positions A and B corresponds to the tone arm moving part.

Rows of through holes 20a through 20e are arranged concentrically, between the positions B and D on the code plate 16. The through holes 20a through 20d, and through hole 20e, respectively, are provided spread over the range a, and the ranges a and b. The rows of through holes 21a and 21e are provided, respectively, on the code plate 16, at an opposing position to the center line of the position detection part 19 upon the code plate 16 at the position A. The through holes 21a and 21e are, respectively, on the identical circumference of the circle as that of the through holes 20a and 20e.

The light emitting part 17 of the position detection part 19 comprises, as shown in FIG. 3, for example, light emitting element now 22 comprising five light emitting elements 22a through 22e aligned in one line, and a slit plate 24 provided with slits 23a through 23e corresonding to each of the light emitting elements. The light receiving part 18 comprises light receiving element row 25 comprising light receiving elements 25a through 25e aligned in one line, and a slit plate 27 provided with slits 26a through 26e corresponding to each of the light receiving elements. The light emitting elements 22a through 22e, the slits 23a through 23e, the slits 26a through 26e, and the light receiving elements 25a through 25e are arranged so that the elements designated with the same subscript (a–e) confront each other. Each of the slits is provided to prevent the light transmission from the light emitting elements to light receiving elements which do not correspond to each of the slits.

The light emitting elements 22a through 22e and the light receiving elements 25a through 25e are arranged so that the elements designated with the same subscript (a–e) confront the through holes 20a through 20e of the slit plate.

Figure 4:
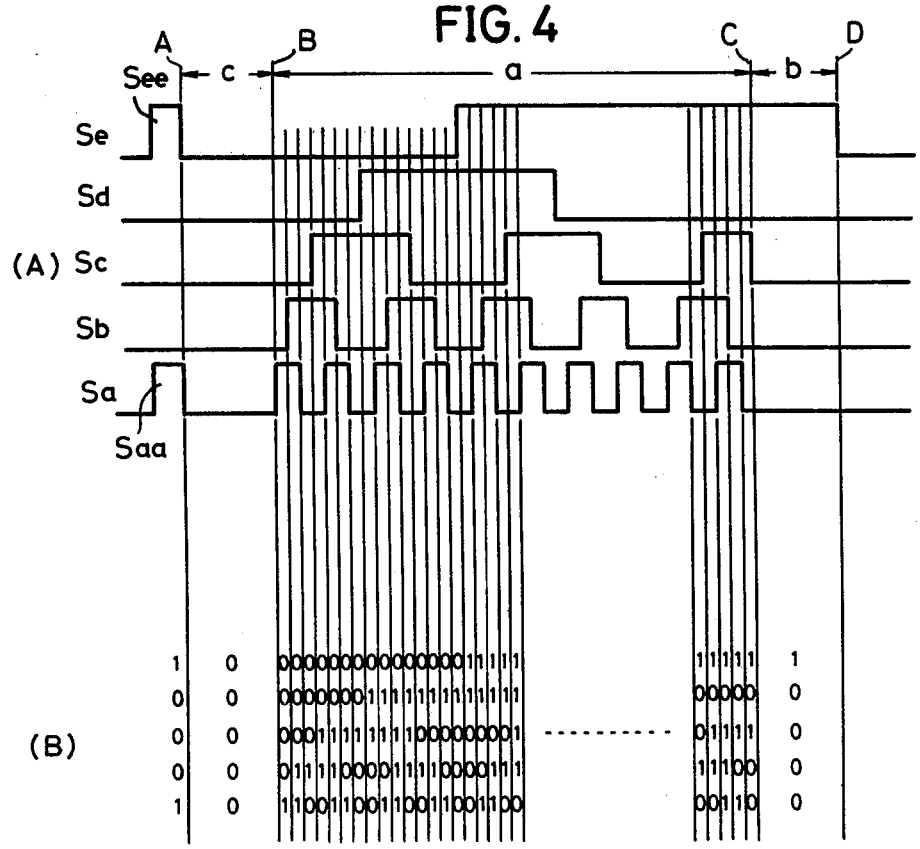
FIG. 4, parts A and B, are, respectively, diagrams showing the signal waveforms obtained from the position detection part of FIG. 3 which moves in the concert with the code plate of FIG. 2, and the code obtained by the coding of the signal waveform.

Upon the rotation of the code plate 16 comprising the above through holes with respect to the position detection part 19 from the position A to position B in the direction of the arrow, the signals $S_a$ through $S_e$ of the waveforms shown in FIG. 4, part A, are produced from the light receiving elements 25a through 25e of the position detection part 19. This output signals $S_a$ through $S_e$ are supplied to the encoder, and coded to a binary coded signal as shown in FIG. 4, part B,. Thus, by knowing the binary coded signal of FIG. 4, part B, the rotated angle position of the tone arm is known.

The lead-in position, the lead-out position, the separation band position at which the plurality of pieces are separated from each other on the record disc, and the like, are stored in the specific address of a memory device in the control device. Upon the playing of the desired piece by the automatic playing of the record disc, the address corresponding to the separation band of the desired piece is specified and read. Accordingly, the tone arm is automatically moved to the separation band position just before the desired piece, lowered at that point, and automatically starts playing from that piece.

In the above embodiment of the present invention, the rows of through holes are considered to be five, and the number of both the light emitting elements and light receiving elements are considered to be five, to simply the explanation. However, to reduce into practice, it is enough to have respective nine light emitting and receiving elements so that binary coded signals of nine bits can be obtained.

If the center line of the detection part 19 does not accurately lie in the radial direction of the code plate 16 (in the direction toward the center of the shaft 12), the waveform of the above signals $S_a$ through $S_e$ becomes of a shifted nature, and the binary coded signal becomes a signal containing the erroneous position information. Therefore, it is necessary to mount the detection part 19 in an accurate position, and upon mounting of the detection part 19, accurate mounting position adjustments must be made. Upon this adjustment, signals $S_{aa}$ and $S_{ee}$ of the signals $S_a$ and $S_e$ obtained by the through holes 21a and 21e of the code plate 16 is displayed on a device such as an oscilloscope, for example, and the mounting position of the position detection part 19 is adjusted so as to have the falling edge lie on a standard line on a display of the oscilloscope.

Figure 5:
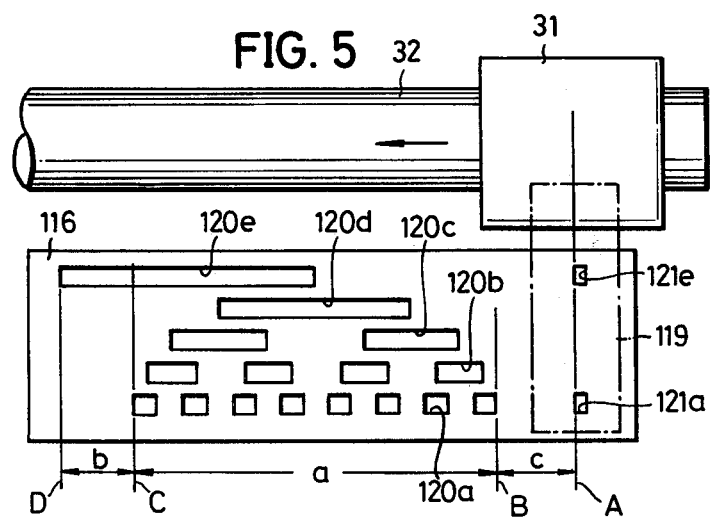
FIG. 5 is a plan view of a code plate of the tone arm position detecting device of a second embodiment of the present invention.

In the above embodiment of the present invention, the record playing apparatus is of a type which rotates the tone arm 11 by the shaft 12, but the invention can also be applied to a type in which the whole tone arm lineraly undergoes displacement to move the stylus of the pickup cartridge linearly along the radial direction of the record disc, in a record playing apparatus comprising the so called linear tracking system. This form of the embodiment is shown in FIG. 5.

An arm base 31 provided with a tone arm moves linearly along a rail 32. A position detection part 119 of the same construction as the above position detection part 19 is attached at the bottom part of the arm base 31, and undergoes displacement unitarily with the base 31 and the tone arm.

A rectangular code plate 116 is immovably mounted in the insertion position between the light emitting part and the light receiving part of the position detection part 19. The rows of through holes 120a thrugh 120e, 121a, and 121e correspond to the rows of through holes 20a through 20e, 21a, and 21e, respectively, of the code plate 16 of the above embodiment, and are provided on the code plate 116.

In this embodiment as well, upon the displacement of the position detection part 119 with the tone arm, the signals $S_a$ through $S_e$ of the waveform shown in FIG. 4, part A, is obtained from the light emitting part, and by providing these signals to the encoder, the binary coded signals shown in FIG. 4, part B, is obtained, thus the position of the tone arm can be known. Furthermore, the positions A through D and the range a through c in FIG. 5 respectively correspond to those shown in FIG. 2.

Next, the third embodiment of the tone arm position detecting device of the present invention will be explained. This embodiment is used to start playing the record disc by displacing the stylus of the pickup cartridge of the tone arm to the lead-in position automatically, according to the diameter of the record disc.

A through hole 421 is formed within an arm moving range $d_1$ between the arm rest position A and the 30 cm record disc lead-in position E, and a through hole 422 is formed within a range $d_4$ between the 25 cm record disc lead-in position and the lead-out position H, on the code plate 41 attached to the shaft 12. In addition, a through hole 423 is formed within a range $d_2$ between the position E and the 17 cm record disc lead-in position G, a through hole 424 is formed within a range $d_3$ between the positions F and G, and a through hole 425 is formed within a range beyond the range $d_4$ between the positions G and H. Those through holes are respectively formed arcuately and concentrically.

Figure 7:
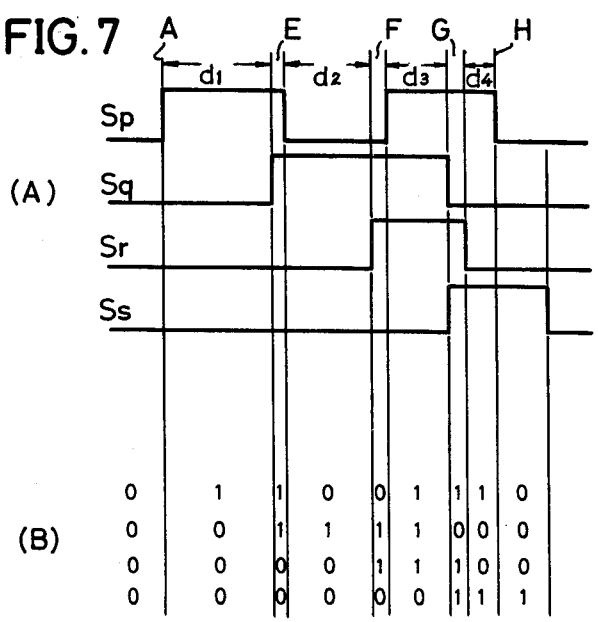
FIG. 7, parts A and B, are, respectively, diagrams showing the signal waveforms obtained from the position detection part cooperating with the code plate of FIG. 6, and the code obtained by the coding of the signal waveforms.

A position detection part 42 comprises four light emitting elements and four light receiving elements corresponding to the through holes 421 through 425. Upon rotation of the code plate 41 in the direction of the arrow, signals $S_p$ through $S_s$ of the waveform shown in FIG. 7, part A, is obtained from the position detection part 42. These signals $S_p$ through $S_s$ are provided to the encoder, and transformed to the binary coded signal shown in FIG. 7, part B,. Here, the arm moving range $C_1$, $C_2$, $C_3$, $C_4$, 30 cm, 25 cm, and 17 cm, and the record disc lead-in positions E, F, and G are all indicated by different binary coded signals.

The corresponding binary coded signal is stored in the specific address of the memory device in the control device. Upon the automatic playing of the record disc, the tone arm is automatically moved to the lead-in position according to the diameter size of the record disc and lowered at that position, to automatically play the record disc, by specifying and reading the specific address according to the diameter size of the record disc.

Figure 6:
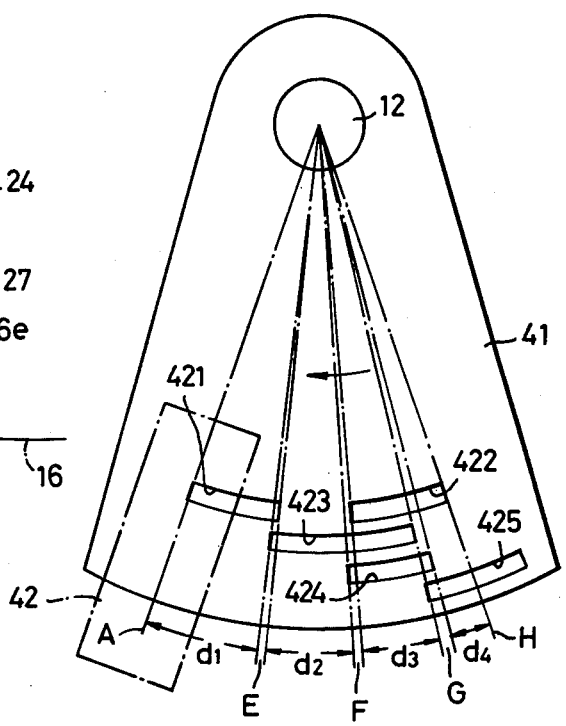
FIG. 6 is a plan view of a code plate of the tone arm position detecting device of a third embodiment of the present invention.

To accurately lower the stylus of the pickup cartridge to the lead-in position of the record disc, since the width of the lead-in position is relatively small, mainly 0.2 mm, the above positions E, F, and G must be of a narrow width corresponding to this. However, only one kind of a binary coded signal need be obtained, respectively, from each of the corresponding ranges $d_1$ through $d_4$. Thus, in the embodiment shown in FIG. 6 and FIG. 7, only nine kinds of binary coded signals are needed, and requires only nine address locations for the address of the memory device. Accordingly, if the number of bits and the addresses are assumed to be n and nine, respectively, from $(2^n-1) \geq 9$, n becomes four, and binary signals for 9 addresses can be obtained by four bits. Therefore, only four rows of the through holes are necessary as shown in FIG. 6.

Furthermore, the above first and the third embodiments can be of the construction in which the code plates 16 and 41 are fixed and the position detection parts 19 and 42 undergo rotational displacement along ith the shaft 12. As a modification of the above third embodiment, the code plate 41 can be of a rectangular shape provided with linearly arranged through holes, in which the position detection part 42 undergoes linear displacement unitariiy with the linear tracking arm.

Figure 8:
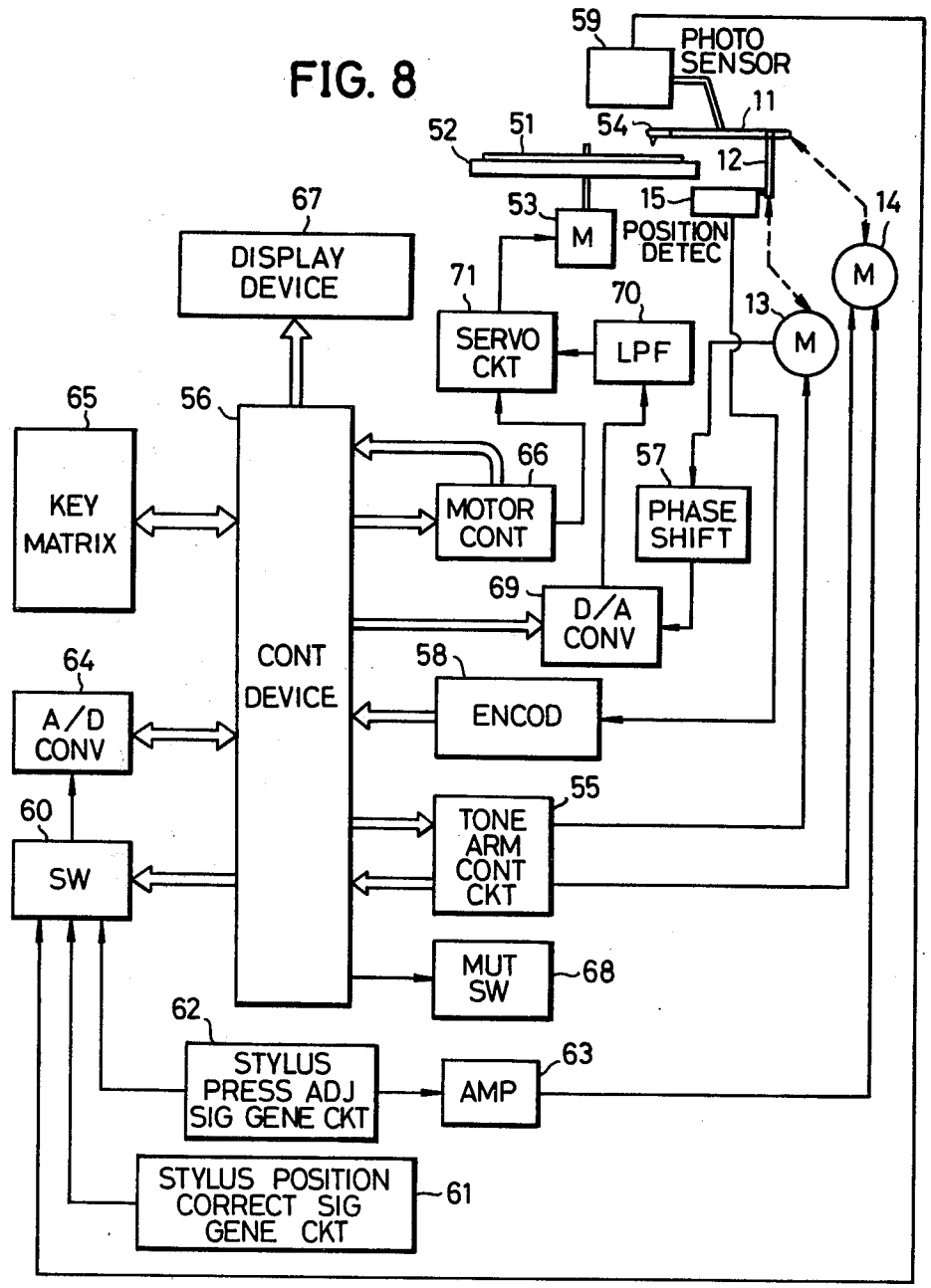
FIG. 8 is a block diagram of one example of an automatic record playing apparatus applied with the tone arm position detecting device of the present invention.

The automatic record playing apparatus using the above tone arm position detection device 15, will now be described in conjunction with the block diagram of FIG. 8.

A record disc 51 is placed on a turntable 52 driven by a motor 53 and is rotated at a specific rotational speed. The cartridge 14 is provided at the distal outer end of the tone arm 11. The horizontal drive motor 13 and the vertical drive motor 14 are driven by an output driving signal of a tone arm control circuit 55. The operation of this control circuit 55 is controlled by a control device 56 comprising a microprocessor. At the same time, this control circuit 55 supplies information relating to the state of the tone arm 11 to the control device 56.

The horizontal drive motor 13 includes a device for generating a rotational angular velocity signal in proportion to rotational angular velocity of the tone arm 11. The produced rotational angular velocity signal is supplied to a phase shifter 57.

As the pickup cartridge 54 traces the sound groove of the record disc 51 and the tone arm 11 swings horizontally, a signal is obtained from the above position detection device 15 and a binary coded corresponding to the horizontal rotational angle of the tone arm 11 is generated. This output binary coded signal of the encoder 58 is supplied to the above mentioned control device 56.

A photosensor 59 is adapted to rotate unitarily with the tone arm 11 and produces a detection signal, which is applied to a changeover switch 60. A circuit 61 for generating signals for correcting the position of the stylus of the pickup cartridge 54 and a circuit 62 for generating signals for adjusting the stylus pressure, which respectively comprise, for example, variable resistors connected to a voltage source of constant voltage, are provided. From the sliding contacts of these circuits 61 and 62, a stylus position correcting signal and a stylus pressure adjusting signal are respectively led out and applied to the changeover switch 60. Furthermore, the stylus pressure adjusting signal from the signal generating circuit 62 is also applied by way of an amplifier 63 to the vertical drive motor 14. The changeover state of the changeover switch 60 is controlled by a signal from the control device 56, and, in response to this control signal, the changeover switch 60 operates to selectively change over the signals applied from the photosensor 59 and the signal generating circuits 61 and 62 and to supply the signals thus switched to an analog-to-digital (A/D) converter 64. The resulting output of the A/D converter 64 is fed to the control device 56.

This control device 56 comprises a microprocessor, random-access memory (RAM), read-only memory (ROM), and other components. The control device 56 is supplied with information signals based on, for example, playing, starting, completion, programmed music piece numbers, and other information signals fed as input from a key matrix 65, an information signal relating to the state of the tone arm 11 from the tone arm control circuit 55, an address information signal from the encoder 58, an information signal relating to the rotational angle of the turntable 52 from a motor control circuit 66, and an information signal from the A/D converter 64.

The output of the control device 56 is fed also to a display device 67, a muting switch 68, and a digital-to-analog (D/A) converter 69. The output of the D/A converter 69 is applied by way of a low-pass filter 70 to a servo circuit 71 for the motor 53.

The address signal from the encoder 58 and the detection signal from the photosensor 59 are stored in a memory device comprising the RAM within the control device 56. The control device 56 is capable of reading out the values of these two signals thus stored and of carrying out comparision operation. Then, prior to automatic playing of the record disc, position such as the lead-in position at the outer periphery of the record disc and the positions of unrecorded separation band between adjacent music pieces are determined as address positions in the radial direction of the turntable 52 and thus stored in the memory device. As a result of this preparation, at the time of automatic record playing, the reproducing stylus is lowered accurately in the unrecorded separation band between music pieces immediately before a desired music piece.

The address signal from the encoder 58 and the signal which has been sent out from the stylus position correcting signal generating circuit 61, and which has passed through the A/D converter 64, are subjected to subtraction within the control device 56, and an accurate address signal in the radial direction of the record disc 51 of the position of the tip of the reproducing stylus is obtained.

Further, this invention is not limited to these embodiments. Variations and modifications may be made without departing from the scope of the invention.

What I claim is:

1. A record disc playing apparatus having a tone arm position detecting device comprising:
   (a) a code part;
   (b) a position detection part comprising a group of optical reading elements disposed at spaced intervals with respect to each other, one of the code part and the position detection part being mounted for movement through a plurality of positions as a function of the position of the tone arm as the tone arm moves between the periphery and the center of the record disc, and scanning the other to detect the position of the tone arm with respect to the apparatus;
   (c) a plurality of rows of slots of various length length provided on the code part, said code part being unevenly divided in the direction of scanning to form short and long division, the short and long divisions conveying information specifying an address, said address indicating the position of the tone arm with a combination of existence and non-existence of the slots of various length along each row of said short and long divisions, the short divisions being defined by offsetting ends of at least two of said rows of slots of various length and disposed between said ends at spaced positions with respect to each other in the direction of the scanning, said short divisions being located on the code part corresponding respectively to particular positions of the tone arm, said rows of slots of various length of the short and long divisions being aligned to said optical reading elements to be exposed thereto as the tone arm moves; and
   (d) an encoder producing binary address codes in response to outputs from said position detection part.

2. A record disc playing apparatus as claimed in claim 1 wherein said tone arm is mounted for rotational displacement on a rotating shaft, said code part is rotatably mounted to undergo displacement with said tone arm and said rows of slots of various lengh are positioned concentrically with respect to each other and the center of rotation of said code part, and wherein said position detection part is stationary.

3. A record disc playing apparatus as claimed in claim 1 in which said tone arm undergoes linear displacement, said position detection part is mounted to unitarily undergo linear displacement with said tone arm, and said position detection part is stationary.

4. A record disc playing apparatus as claimed in claim 1 in which said position detection part comprises a plurality of light emitting elements aligned in a row, a plurality of light receiving elements in facing spaced relationship to each of said light emitting elements, and said code part comprises a code plate positioned between said light emitting elements and light receiving elements of said position detection part.

5. A record disc playing apparatus as claimed in claim 1 in which said rows of slots of various length are formed in a range corresponding to a recording groove range between an outermost peripheral groove position and an innermost groove position.

6. A record disc playing apparatus as claimed in claim 1 in which said rows of slots of various length are formed between positions corresponding to the lead-in groove positions according to different diameters of different kinds of record discs to be played.

* * * * *